US007601234B2

(12) United States Patent
St. Denis et al.

(10) Patent No.: US 7,601,234 B2
(45) Date of Patent: *Oct. 13, 2009

(54) HOUSING CREATED FROM HIGH STRENGTH EXPANDED THERMOFORMABLE HONEYCOMB STRUCTURES WITH CEMENTITIOUS REINFORCEMENT

(75) Inventors: Thomas St. Denis, Rowayton, CT (US); Gabriel M. Karamanis, Stamford, CT (US)

(73) Assignee: Panterra Engineered Plastics, Inc., Stamford, CT (US)

( * ) Notice: Subject to any disclaimer, the term of this patent is extended or adjusted under 35 U.S.C. 154(b) by 94 days.

This patent is subject to a terminal disclaimer.

(21) Appl. No.: 11/453,391

(22) Filed: Jun. 15, 2006

(65) Prior Publication Data

US 2008/0230169 A1 Sep. 25, 2008

Related U.S. Application Data

(60) Provisional application No. 60/690,585, filed on Jun. 15, 2005.

(51) Int. Cl.

*E04B 2/00* (2006.01)
*B29C 65/48* (2006.01)
*B32B 37/14* (2006.01)
*B32B 37/18* (2006.01)
*E04C 2/04* (2006.01)
*E04C 2/22* (2006.01)

(52) U.S. Cl. ........................ 156/71; 156/145; 52/220.4; 52/576; 52/583.1

(58) Field of Classification Search .................. 156/71, 156/145, 242, 244.11, 244.15; 52/220.1–220.4, 52/576, 578, 583.1

See application file for complete search history.

(56) References Cited

U.S. PATENT DOCUMENTS

| | | | | |
|---|---|---|---|---|
| 3,811,814 | A * | 5/1974 | Earle et al. | 425/385 |
| 3,955,019 | A * | 5/1976 | Keith | 428/34.5 |
| 4,313,993 | A * | 2/1982 | McGlory | 428/178 |
| 5,483,778 | A * | 1/1996 | Scrivener | 52/579 |
| 6,000,194 | A * | 12/1999 | Nakamura | 52/783.17 |
| 6,673,415 | B1 * | 1/2004 | Yamazaki et al. | 428/117 |

* cited by examiner

*Primary Examiner*—Philip C Tucker
*Assistant Examiner*—Sing P Chan
(74) *Attorney, Agent, or Firm*—Ohlandt, Greeley, Ruggiero & Perle, L.L.P.

(57) ABSTRACT

A method for producing an engineered building material comprising at least a first and second cementitious reinforced expanded honeycomb product, the method comprising: affixing at least one end of the first cementitious reinforced expanded honeycomb product to at least one end of the second cementitious reinforced expanded honeycomb product via a coupler device.

13 Claims, 6 Drawing Sheets

HOUSING CREATED FROM HIGH STRENGTH EXPANDED THERMOFORMABLE HONEYCOMB STRUCTURES WITH CEMENTITIOUS REINFORCEMENT

CROSS REFERENCE TO RELATED APPLICATION

The present application is claiming priority of U.S. Provisional Application Ser. No. 60/690,585, filed on Jun. 15, 2005.

BACKGROUND OF THE INVENTION

1. Field of the Invention

The present invention relates to a product and method for manufacturing materials used in constructing residential housing units. More particularly, the present invention relates to a product and method for making expanded thermoformable honeycomb materials with cementitious reinforcement and foam coupled with a metallic or nonmetallic extrusion framing system.

2. Description of the Prior Art

Processes used to make expanded thermoformable honeycomb materials typically involve placing a thermoformable, thermoplastic polymeric material sheet between mold platens, which are attached to a heated press. The thermoformable, thermoplastic, polymeric material sheet is heated to a specific temperature at which the thermoformable material will adhesively bond to the mold platens by a hot tack adhesion mechanism. The mold platens are than separated apart with the thermoformable material adhering to the mold platens so as to affect an expansion of the cross-section of the thermoformable material.

Typically, the surfaces of the mold platens that are bonded to the thermoplastic material sheet have a number of perforations. The thermoplastic material will adhesively bond to the non-perforated portion of this surface so that when the mold platens are separated apart, a number of cells will be formed within the cross-section of the expanded thermoformable material. Generally, these perforations can have a variety of different geometries and can be arranged in an array of patterns on the surface of the mold platens, thereby creating thermoformable materials having a variety of cross-sectional geometries.

The processes previously referenced produce an expanded thermoformable honeycomb material product that is strong and durable, with a conical closed cell design that creates an internal truss structure which is an important element of its strength. Certain engineering characteristics of the thermoplastic polymers used make them capable of producing high quality, high strength expanded thermoformable honeycomb materials.

Historically, residential housing has been constructed over the years utilizing numerous materials and construction techniques. Two of the most common techniques for building a foundation for residential housing are to build a solid foundation or slab out of cement, or to build the foundation out of concrete blocks. After the foundation is constructed, the frame of the structure is attached to the foundation utilizing 2×4, 2×6, 2×8 or 2×10 Douglas Fir, or other suitable materials, which can be nailed or screwed together to form the basic stud frame or internal structure of the residential housing. After the wood framing is complete, plywood is attached to the outer framing studs and is used as a reinforcing material for walls, floors and ceilings. Insulation either in a foam or fiberglass form is placed in between the vertical and horizontal wooden studs prior to attaching sheet rock or other interior materials to the interior side of the wooden structure.

As an alternative method of construction, brownstone or cement bricks can be utilized in building the structure depending on preference and or geographic locations where humidity and climatic conditions play a factor in choosing non-wooden structures. Other construction techniques such as those utilizing wooden logs, prefabricated structures using various composites, or metal and glass structures have been used over the years as alternate techniques.

The associated problems with these construction techniques and materials vary depending on the type of construction utilized. Long construction cycles are typical for residential housing fabricated from brownstone or bricks as well as wooden stud structures that utilize plywood and sheet rock for the exterior and interior reinforcing members. Depending on the size and complexity of the structure to be built, construction cycle times can vary from a minimum 3-4 weeks to as much as 5-6 months or longer.

These long construction cycles can also involve excessive skilled labor costs. Individuals who specialize in framing, brick laying, sheet rocking, etc. must be utilized to construct the basic structure and in many areas, union labor must be employed on the job sites.

In addition to the associated problems mentioned, some of the materials used, such as wood for framing, plywood and roofing materials, burn readily, which is problematic. Also, wood products can absorb moisture and rot and are susceptible to termite invasion and are not good thermal insulators.

Accordingly, there is a need for a product and a method for producing residential housing that overcomes the disadvantages of the methods discussed above.

SUMMARY OF THE INVENTION

The present invention provides a system for constructing residential housing utilizing expanded thermoformable honeycomb materials with cementitious reinforcement. This method/system comprises the steps of: placing an expanded thermoformable honeycomb in a mold or suitable mold; partially or completely filling either or both sides of the honeycomb with cementitious material; vibrating the cementitious material within the structure to eliminate any air pockets or voids; leveling the cementitious material and allowing it to cure at room or elevated temperature; removing the structure from the mold/mold; filling one side of the honeycomb structure with flame retardant or non flame retardant insulating foam if required; bonding sheet rock or another suitable interior material over the foam; and bonding or mechanically fastening the prefabricated composite panels into either steel, aluminum or fiber reinforced plastic extrusions that will accept the panels. Thus, a rigid, structurally sound and insulated composite structure system is produced for use in a variety of building applications.

A method for producing an engineered building material comprising at least a first and second cementitious reinforced expanded honeycomb product, said method comprising: affixing at least one end of said first cementitious reinforced expanded honeycomb product to at least one end of said second cementitious reinforced expanded honeycomb product via a coupler device.

Preferably, each of said first and second cementitious reinforced expanded honeycomb products is formed by a method comprising: contacting at least a first side of at least one expanded honeycomb material with a semisolid or liquid cementitious material, wherein the cementitious material penetrates at least a first portion of the honeycomb material, thereby forming an integrated honeycomb/cementitious product; vibrating the integrated honeycomb/cementitious product to remove air pockets or void therefrom and/or level the surface of the cementitious product which is opposite from the interface between the expanded honeycomb material and the cementitious material; and curing the integrated honeycomb/cementitious product, thereby forming said cementitious reinforced expanded honeycomb product.

The method further comprising contacting a foam material to a second surface of said first and/or second cementitious reinforced expanded honeycomb products.

The method further comprising affixing a wall board material to a second surface of said first and/or second cementitious reinforced expanded honeycomb products.

The method further comprising disposing a foam material between said wall board material and said second surface of said first and/or second cementitious reinforced expanded honeycomb products.

The coupler device is an extruded material. The extruded material is at least one selected from the group consisting of: steel, aluminum, fiber glass filled epoxy, polyester and vinyl ester.

The expanded honeycomb material comprises at least one material selected from the group consisting of: high impact polystyrene, polycarbonate, acrylonitrile butadiene styrene, homo- or co-polymer polypropylene, low or high density polyethylene, and any combinations thereof. The expanded honeycomb material further comprises at least one additive selected from the group consisting of: plastic, glass, mineral, carbon, ceramic, boron, wood, aramid, or metal fibers, carbon nanotubes or nanoclays, calcium carbonate, calcium silicate, calcium sulfate, aluminum silicate, alumina trihydrate, glass microspheres, carbon black, solid/liquid or paste pigments, silicon dioxide, butadiene, acrylonitrile, carboxyl terminated butadiene styrene, and recycled materials.

The cementitious material comprises at least one additive selected from the group consisting of: plastic, glass, mineral, carbon, ceramic, boron, wood, aramid, or metal fibers, carbon nanotubes or nanoclays, calcium carbonate, calcium silicate, calcium sulfate, aluminum silicate, alumina trihydrate, glass microspheres, carbon black, solid/liquid or paste pigments, silicon dioxide, butadiene, acrylonitrile, carboxyl terminated butadiene styrene, and recycled materials.

Preferably, the end of said first cementitious reinforced expanded honeycomb product to at least one end of said second cementitious reinforced expanded honeycomb product are connected to said coupling device by means of either a structural adhesive or mechanical fastening.

The foam material comprises at least one material selected from the group consisting of: polyurethane, urethane, phenolic, urea formaldehyde, polyisocyanurate, polystyrene, intumescent and halogen, and halogen free foams.

The coupling device is formed from at least one material selected from the group consisting of: steel, aluminum, fiber glass filled epoxy, polyester and vinyl ester.

The method further comprising: contacting at least a second side of said expanded honeycomb material with a semisolid or liquid cementitious material, wherein the cementitious material penetrates at least a first portion of the honeycomb material, thereby forming an integrated honeycomb/cementitious product; vibrating the integrated honeycomb/cementitious product to remove air pockets or void therefrom and/or level the surface of the cementitious product which is opposite from the interface between the expanded honeycomb material and the cementitious material; and curing the integrated honeycomb/cementitious product, thereby forming said cementitious reinforced expanded honeycomb product having cementitious material disposed on both sides of said expanded honeycomb material.

Other advantages and features of the present invention will be understood by referencing the following specification in conjunction with the related drawings.

DETAILED DESCRIPTION OF THE INVENTION

In the present invention, the raw material sheet from which the expanded honeycomb is formed is carefully selected for its engineered performance characteristics. The raw material sheet should have the appropriate orientation, elongation and melt index characteristics prior to being manufactured into a honeycomb, so that when the composite structure of the present invention is formed by the process described below, the composite structure will have high strength, rigidity and overall structural integrity.

Extruded or molded sheets of thermoplastic material can be used in this process. Examples of raw materials that can be used include, but are not limited to, high impact polystyrene, polycarbonate, acrylonitrile butadiene styrene, homo- or copolymer polypropylene, low and high density polyethylene, or a host of other thermoplastic materials. These materials can be extruded or molded utilizing co-extrusions, molded layers, alloys, fiber/filler/nano reinforced polymers, recycled materials, or variations and combinations of all of the above. The materials selected can be a heterogeneous mixture, and can be extruded so that the heated thermoformable sheet used to make the honeycomb comprises a plurality of layers. For example, the thermoformable sheet can comprise a pair of outer layers comprising a first material and an inner layer comprising a second material, wherein said inner layer is disposed between said pair of outer layers. Such methods and materials are well known in the art.

Figure 1:
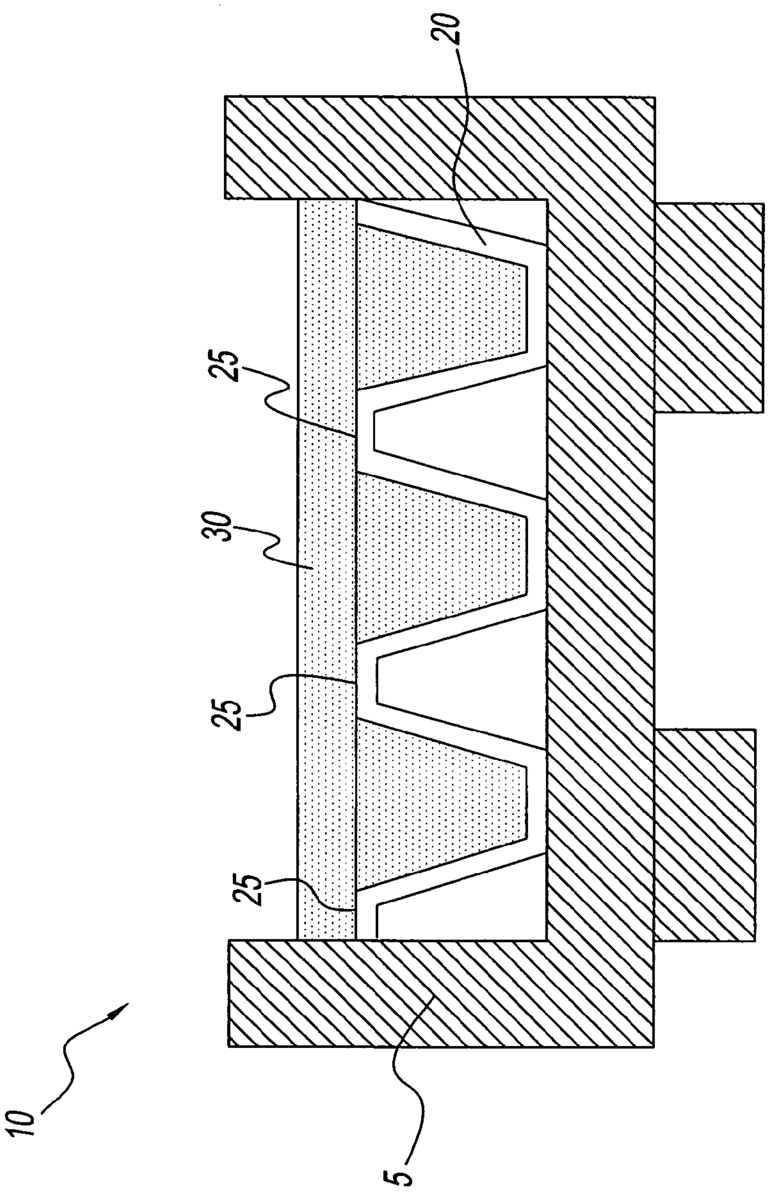
FIG. 1 shows a cross-section of a mold, honeycomb, and layer of cementitious material according to a first embodiment of the present invention.
Figure 2:
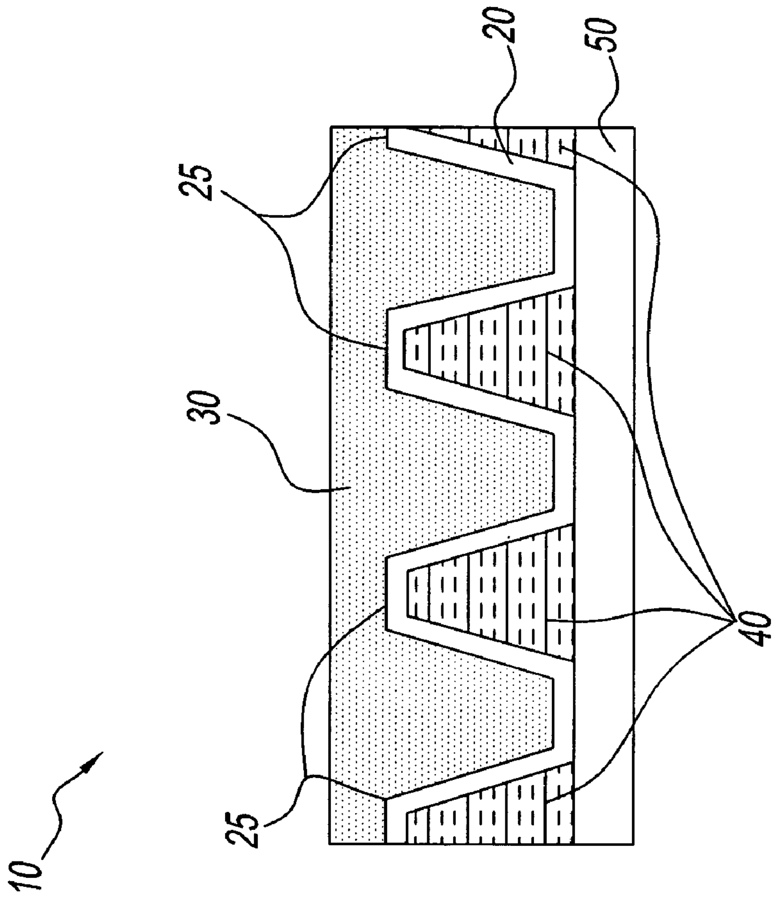
FIG. 2 shows a cross-section of a first embodiment of the composite structure of the present invention.

Referring to FIGS. 1 and 2, a cross-section of a first embodiment of the composite structure of the present invention is shown, generally referred to by numeral 10. Once the expanded honeycomb 20 is formed, it is placed in a mold or suitable mold 5. The mold of the present invention can comprise any material suitable for the below described processes, including but not limited to steel, aluminum, composite epoxy, homo- or co-polymer polypropylene, glass filled homo- or co-polymer polypropylene, low or high density polyethylene, glass filled low or high density polyethylene, acetal, PTFE filled acetal, or combinations thereof.

A layer of cementitious material 30, with or without aggregate or fibrous reinforcement, is introduced into the expanded thermoplastic honeycomb structure 20 fully to fill one side of the honeycomb 20, and extend slightly beyond a plane defined by peaks 25 of honeycomb 20.

After the appropriate amount of cementitious material has been delivered into the honeycomb 20, the mold or forming tool 5 with the honeycomb 20 and layer of cementitious material 30 is vibrated to eliminate any air pockets or voids. The layer of cementitious material 30 is then leveled and cured at room or elevated temperature. After the layer of cementitious material 30 is cured, pockets of foam 40 are injected into the open side of the honeycomb 20. The foam used can be insulating foam, and can also optionally be flame retardant.

The foam pockets 40 are then allowed to cure. A layer of interior material 50 can be bonded over the foam pockets 40 to form the composite structure 10. The interior material used in the present invention can be drywall or any other material suitable use in the interior of a residential dwelling.

Figure 3:
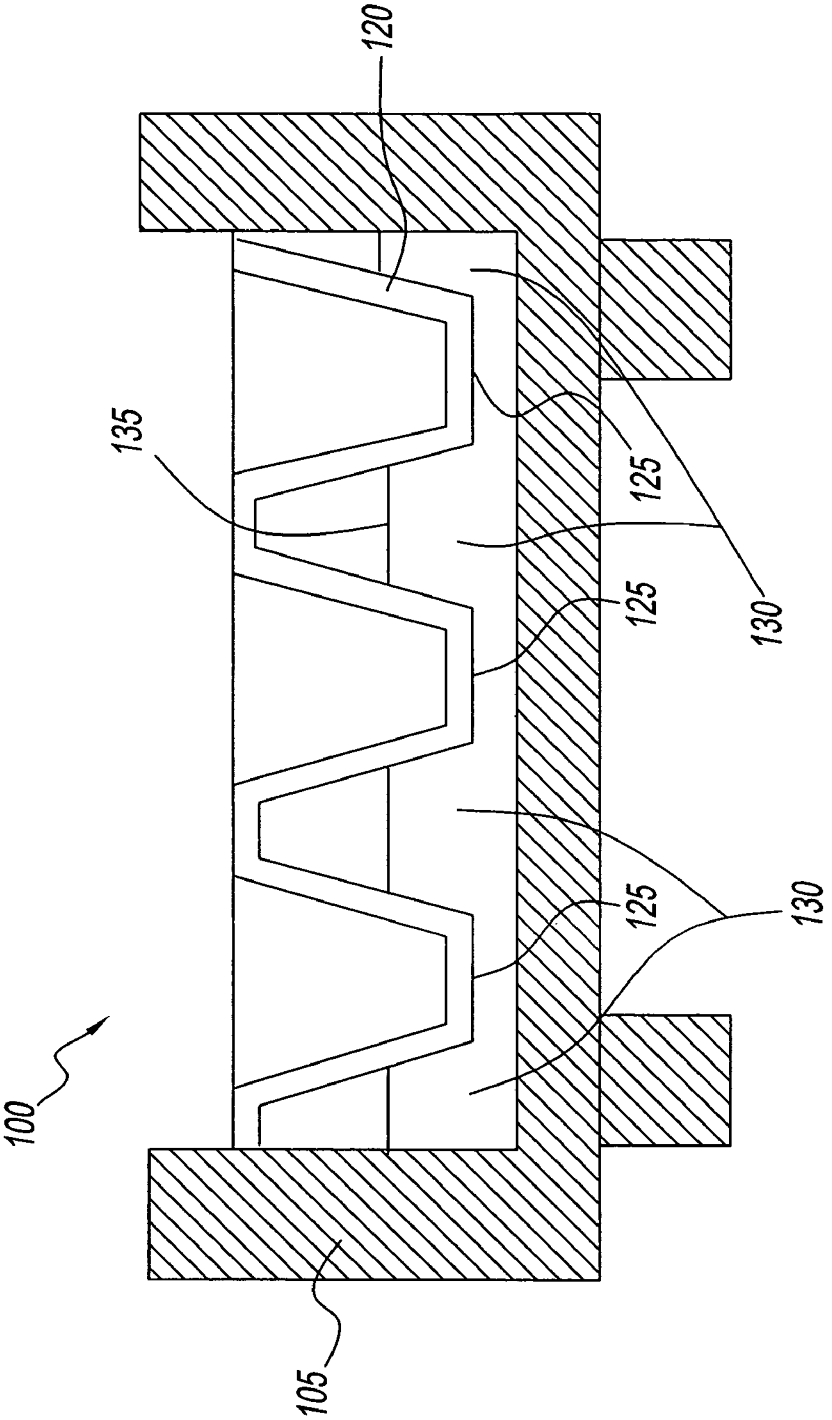
FIG. 3 shows a cross-section of a mold, honeycomb, and layer of cementitious material according to a second embodiment of the present invention.
Figure 4:
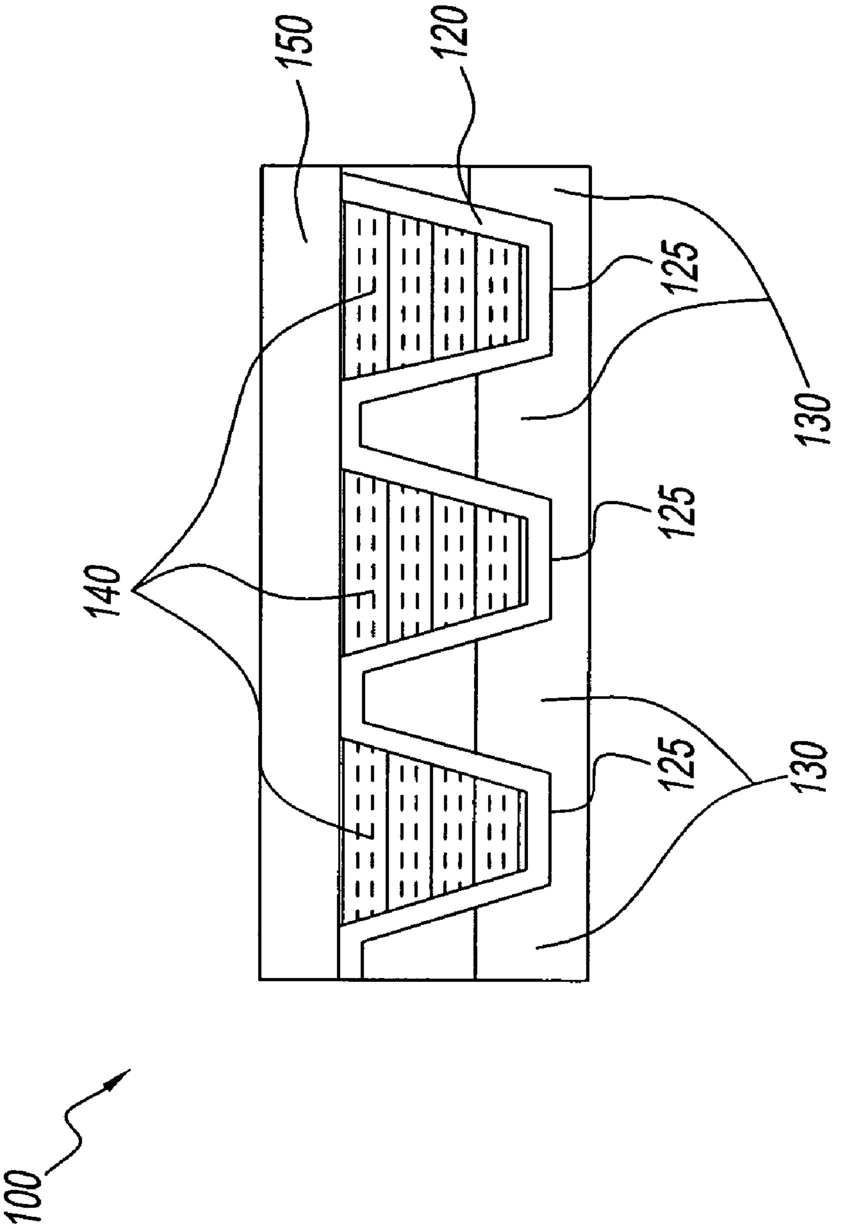
FIG. 4 shows a cross-section of a second embodiment of the composite structure of the present invention.

Referring to FIGS. 3 and 4, a cross-section of a second embodiment of the composite structure of the present invention is shown, generally referred to by numeral 100. In this embodiment, a mold or suitable mold 105 is filled to an appropriate level with a layer of cementitious material 130, with or without aggregate or fibrous reinforcement. A honeycomb 120 is placed in the mold 105 and forced into the layer of cementitious material 130 so that the cementitious material is allowed to partially fill the honeycomb 120 to a preset height 135 and extend slightly beyond a plane defined by peaks 125 of honeycomb 120.

The advantage to partially filling the honeycomb 120 with the layer of cementitious material 130 is that the resulting composite structures 100 are lighter, easier to handle, and use less material, which reduces cost. Alternatively, the honeycomb 120 can be forced into the layer of cementitious material 130 so that the material completely fills honeycomb 120.

After the appropriate amount of cementitious material has been delivered into the honeycomb 120, the mold or forming tool 105 with the honeycomb 120 and layer of cementitious material 130 is vibrated to eliminate any air pockets or voids. The layer of cementitious material 130 is then leveled and cured at room or elevated temperature. After the layer of cementitious material 130 is cured, pockets of foam 140 are injected into the open side of the honeycomb 120. As discussed above, the foam used can be insulating foam, and can also optionally be flame retardant.

The foam pockets 140 are then allowed to cure. A layer of interior material 150 can be bonded over the foam pockets 140 to form the composite structure 110. The foam used in the present invention can comprise a material selected from the group consisting of: polyurethane, urethane, phenolic, urea formaldehyde, polyisocyanurate, polystyrene, intumescent and halogen and halogen free foams. The interior material used in the present invention can be drywall or any other material suitable for interior use.

In another embodiment of the present invention, the foam pockets can be eliminated, in geographic regions where thermal insulation or flame retardancy is not critical or required. Additionally, the honeycomb core of the composite structure can be filled on both sides with cementitious material in lieu of foam. The second side of the honeycomb can be filled by removing the composite structure from the mold, and repeating the above outlined steps for the second side of the honeycomb.

Either the thermoformable material that comprises the honeycomb or the cementitious material can further comprise additional additives or fillers to provide additional strength. Such additives or fillers can be selected from the group consisting of: plastic, glass, mineral, carbon, ceramic, boron, wood, aramid, or metal fibers, carbon nanotubes or nanoclays, calcium carbonate, calcium silicate, calcium sulfate, aluminum silicate, alumina trihydrate, glass microspheres, carbon black, solid/liquid or paste pigments, silicon dioxide, flexible polymeric materials such as butadiene, acrylonitrile, carboxyl terminated butadiene styrene, and recycled materials.

Figure 5:
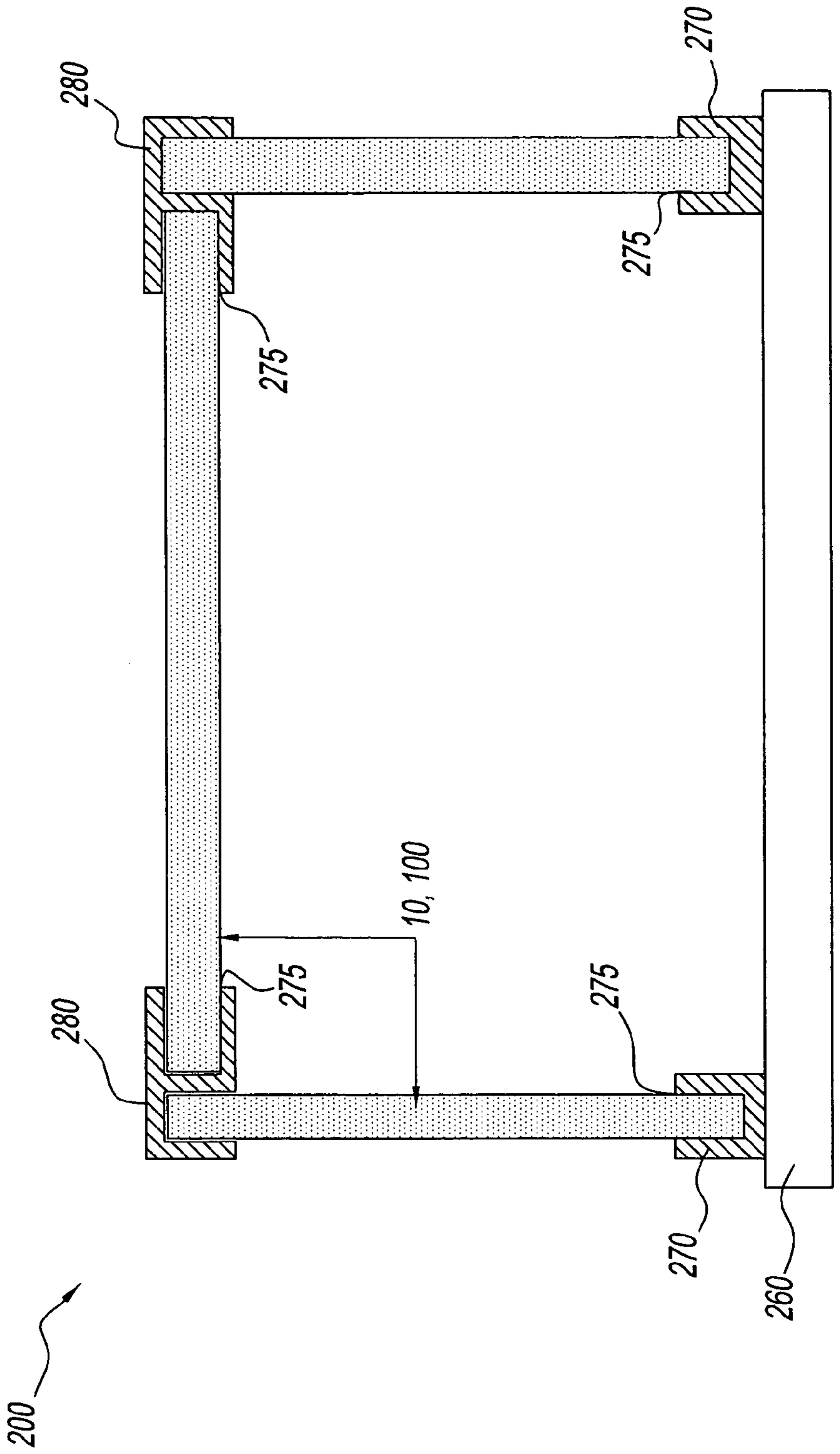
FIG. 5 shows an example of how the composite structures of the present invention can be assembled in a residential housing application.

Referring to FIG. 5, an assembly 200 of the composite structures of the present invention assembled in a housing application is shown. Assembly 200 has foundation 260, base extrusions 270, and ceiling and wall extrusions 280. Either composite structure 10 or composite structure 100 can be connected to an extrusion, through the use of a layer of structural adhesive 275. Although in the shown embodiment the composite structures are bonded to the extrusions 270 and 280 with adhesive, the present invention contemplates a number of ways to connect composite structures 10 and 100 to extrusions 270 and 280, including other methods of bonding or mechanically fastening. Additionally, the extrusions 270 and 280 can be steel, aluminum, fiber reinforced plastic extrusions, or any other material that will accept the panels and produce a rigid, structurally sound and insulated assembly for use in residential housing.

Figure 6B:
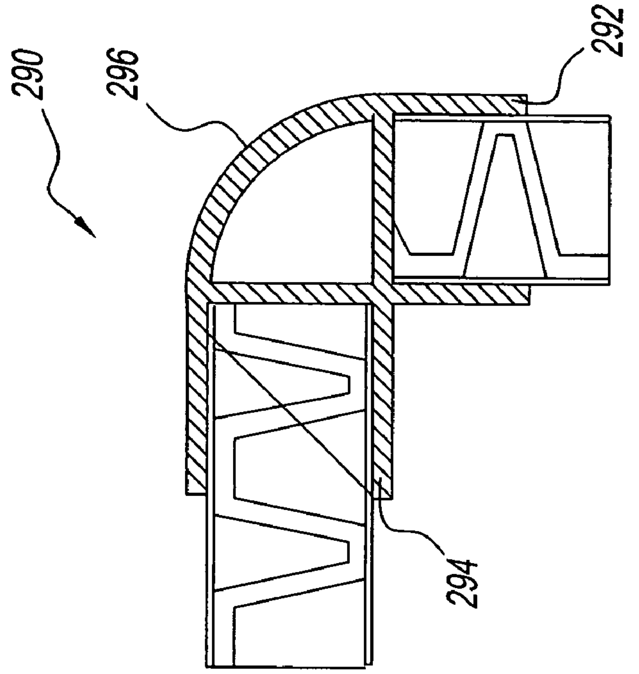
FIGS. 6*a* and 6*b* show cross sections of sample corner extrusions that can be used in an assembly of the composite structures of the present invention.
Figure 6A:
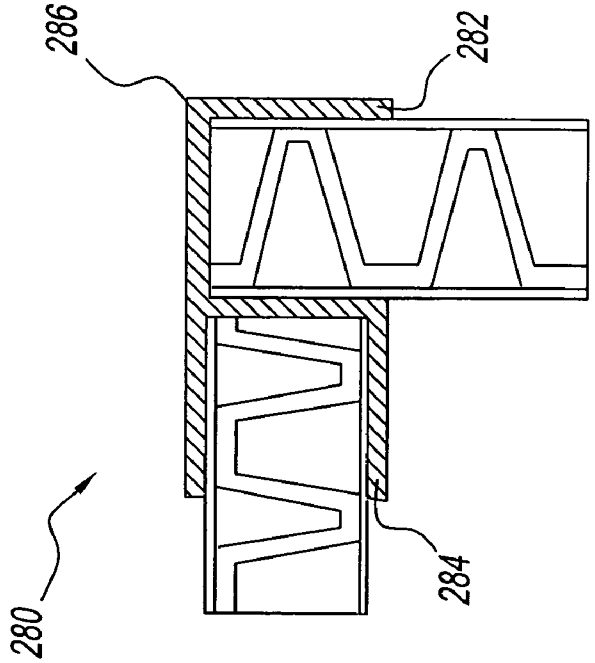

Referring to FIGS. **6*a* and 6*b*, sample corner extrusions for use in the assembly of FIG. 3 are shown. Corner extrusion 280 of FIG. 6*a*, which is the same as that shown in FIG. 5, has vertical channel 282 and horizontal channel 284, both of which are adapted for receiving the composite structures of the present invention. Channels 282 and 284 are oriented so that corner extrusion 280 has a square exterior edge 286. Corner extrusion 290, shown in FIG. 6*b*, has vertical channel 292 and horizontal channel 294, also adapted for receiving composite structures. Channels 292 and 294, however, are oriented so that corner extrusion 290 has a curved exterior edge 296**.

One skilled in the art can readily see the flexibility and adaptability of this unique, honeycomb/cementitious material/foam composite structure when combined with the extrusion framing. The combination of the expanded honeycomb, cementitious material, foam material, and interior material, coupled with the extrusion framing system, creates a structure that has excellent strength, structural integrity, insulation and flame retardant characteristics and is easily constructed into a structure suitable for residential housing. Although the composite structures of the present invention are particularly suited for use in low cost single- or dual-level residential housing applications, they can be adapted for other applications as well.

A significant advantage of the present invention is that the composite panel structure is prefabricated, which can significantly reduce the time associated with constructing the residential housing. The housing structure can be constructed in a fraction of the time it would take to build the structure using conventional methods. This reduction in construction time equates to more units potentially being built in the same time frame as with previous techniques.

Another significant advantage of the present invention is the savings in labor costs associated with assembling the composite structures into a residential housing unit. The prefabricated composite structures of the present invention can help to reduce the amount of expensive skilled labor utilized, which results in greater profits for the general contractors.

Another advantage of the present invention is the ease of installation of the panel system since the panels are prefabricated and are joined to the extrusion framing by mechanical fastening or structural adhesives which are in contact with the composite panels inside the extrusions used. The adhesives may also act as a barrier to insects invading the housing from outside.

Other significant attributes of the current invention are the inherent flame retardancy, sound dampening and insulative properties that the composite structure system possesses, despite the low cost and ease of installation associated with the present invention.

The present invention having been thus described with particular reference to the preferred forms thereof, it will be obvious that various changes and modifications may be made therein without departing from the spirit and scope of the present invention as defined herein.

What is claimed is:

1. A method for producing an engineered building material comprising at least a first and second cementitious reinforced expanded honeycomb product, said method comprising:

contacting at least a first side of at least one expanded honeycomb material with a semisolid or liquid cementitious material, wherein the cementitious material fully fills said at least first side of the expanded honeycomb material, thereby forming at least one integrated honeycomb/cementitious product;

curing said integrated honeycomb/cementitious product, thereby forming said cementitious reinforced expanded honeycomb product; and affixing at least one end of said first cementitious reinforced expanded honeycomb product to at least one end of said second cementitious reinforced expanded honeycomb product via a coupler device, wherein said expanded honeycomb product comprises at least one material selected from the group consisting of: high impact polystyrene, polycarbonate, acrylonitrile butadiene styrene, homo- or co-polymer polypropylene, low or high density polyethylene, and any combinations thereof.

2. The method according to claim 1, further comprising a vibrating step, wherein during said vibrating step, said integrated honeycomb/cementitious product is vibrated to remove air pockets or void therefrom and/or level the surface of the cementitious product which is opposite from the interface between the expanded honeycomb material and the cementitious material.

3. The method of claim 1, further comprising contacting a foam material to a second side of said first and/or second cementitious reinforced expanded honeycomb products.

4. The method of claim 3, wherein said foam material comprises at least one material selected from the group consisting of: polyurethane, urethane, phenolic, urea formaldehyde, polyisocyanu rate, polystyrene, intumescent and halogen, and halogen free foams.

5. The method of claim 1, further comprising affixing a wall board material to a second side of said first and/or second cementitious reinforced expanded honeycomb products.

6. The method of claim 5, further comprising disposing a foam material between said wall board material and said second side of said first and/or second cementitious reinforced expanded honeycomb products.

7. The method of claim 1, wherein said coupler device is an extruded material.

8. The method of claim 7, wherein said extruded material is at least one selected from the group consisting of: steel, aluminum, fiber glass filled epoxy, polyester and vinyl ester.

9. The method of claim 1, wherein said expanded honeycomb material further comprises at least one additive selected from the group consisting of: plastic, glass, mineral, carbon, ceramic, boron, wood, aramid, or metal fibers, carbon nanotubes or nanoclays, calcium carbonate, calcium silicate, calcium sulfate, aluminum silicate, alumina trihydrate, glass microspheres, carbon black, solid/liquid or paste pigments, silicon dioxide, butadiene, acrylonitrile, carboxyl terminated butadiene styrene, and recycled materials.

10. The method of claim 1, wherein said cementitious material comprises at least one additive selected from the group consisting of: plastic, glass, mineral, carbon, ceramic, boron, wood, aramid, or metal fibers, carbon nanotubes or nanoclays, calcium carbonate, calcium silicate, calcium sulfate, aluminum silicate, alumina trihydrate, glass microspheres, carbon black, solid/liquid or paste pigments, silicon dioxide, butadiene, acrylonitrile, carboxyl terminated butadiene styrene, and recycled materials.

11. The method of claim 1, wherein said at least one end of said first cementitious reinforced expanded honeycomb product and said at least one end of said second cementitious reinforced expanded honeycomb product are connected to said coupling device by means of either a structural adhesive or mechanical fastening.

12. The method of claim 1, wherein said coupling device is formed from at least one material selected from the group consisting of: steel, aluminum, fiber glass filled epoxy, polyester and vinyl ester.

13. The method of claim 1, further comprising:

contacting at least a second side of said expanded honeycomb material with a semisolid or liquid cementitious material, wherein the cementitious material penetrates vibrating the integrated honeycomb/cementitious product to remove air pockets or void therefrom and/or level the surface of the cementitious product which is opposite from the interface between the expanded honeycomb material and the cementitious material; and curing the integrated honeycomb/cementitious product, thereby forming said cementitious reinforced expanded honeycomb product having cementitious material disposed on both sides of said expanded honeycomb material.

* * * * *